(12) United States Patent
Benard et al.

(10) Patent No.: US 9,145,782 B2
(45) Date of Patent: Sep. 29, 2015

(54) METHOD FOR MANUFACTURING AN ASSEMBLY INCLUDING A PLURALITY OF BLADES MOUNTED IN A PLATFORM

(75) Inventors: Jean-Paul Benard, Veneux les Sablons (FR); Vanessa Mengeling, Massy (FR); Jean-Baptiste Mottin, Paris (FR)

(73) Assignee: SNECMA, Paris (FR)

( * ) Notice: Subject to any disclaimer, the term of this patent is extended or adjusted under 35 U.S.C. 154(b) by 863 days.

(21) Appl. No.: 13/265,153

(22) PCT Filed: Apr. 16, 2010

(86) PCT No.: PCT/EP2010/055040
§ 371 (c)(1),
(2), (4) Date: Oct. 19, 2011

(87) PCT Pub. No.: WO2010/121966
PCT Pub. Date: Oct. 28, 2010

(65) Prior Publication Data
US 2012/0039738 A1    Feb. 16, 2012

(30) Foreign Application Priority Data

Apr. 24, 2009  (FR) ..................... 09 52707

(51) Int. Cl.
| F01D 9/04 | (2006.01) |
| B22F 5/04 | (2006.01) |
| B22F 7/06 | (2006.01) |
| B23P 15/00 | (2006.01) |

(52) U.S. Cl.
CPC . *F01D 9/044* (2013.01); *B22F 5/04* (2013.01); *B22F 7/062* (2013.01); *B23P 15/006* (2013.01); *B22F 2998/10* (2013.01); *F05D 2230/21* (2013.01); *F05D 2230/22* (2013.01); *F05D 2300/43* (2013.01); *F05D 2300/603* (2013.01)

(58) Field of Classification Search
CPC ............ F01D 9/044; B22F 5/04; B22F 7/062; B22F 2998/10; B22F 3/225; B23K 2201/001
USPC ........................................... 419/38
See application file for complete search history.

(56) References Cited

U.S. PATENT DOCUMENTS

| 4,063,939 | A | * | 12/1977 | Weaver et al. ............... 419/5 |
| 4,323,394 | A | | 4/1982 | Hoffmuller et al. |
| 4,526,747 | A | | 7/1985 | Schimmel et al. |
| 5,536,145 | A | * | 7/1996 | Vandendriessche ...... 416/213 R |
| 2007/0102572 | A1 | * | 5/2007 | Bohdal ........................ 244/62 |

FOREIGN PATENT DOCUMENTS

| DE | 23 62 469 | 6/1975 |
| FR | 2 317 502 | 2/1977 |

OTHER PUBLICATIONS

International Search Report Issued Jul. 27, 2010 in PCT/EP10/055040 Filed Apr. 16, 2010.

\* cited by examiner

*Primary Examiner* — Weiping Zhu
(74) *Attorney, Agent, or Firm* — Oblon, McClelland, Maier & Neustadt, L.L.P.

(57) ABSTRACT

A method of manufacturing an assembly, including a plurality of blades mounted in a platform preparing a mixture of metal powder and thermoplastic binder, includes manufacturing the blades separately from the platform, and finishing the blades after the manufacturing. The method also includes injecting the mixture into a mold to obtain a platform blank, removing the binder from the platform blank prior to assembling the finished blades with the blank, inserting one end of the finished blades into a housing formed in the platform blank in order to assemble the assembly, and sintering the assembly comprising the platform blank and the finished blades to unify the assembly.

3 Claims, 3 Drawing Sheets

METHOD FOR MANUFACTURING AN ASSEMBLY INCLUDING A PLURALITY OF BLADES MOUNTED IN A PLATFORM

TECHNICAL FIELD

The invention relates to the manufacture of a turbo machine blisk (bladed disk) sector in particular a fixed blisk sector.

BACKGROUND

Hereinafter, a fixed blisk sector is known as a stator guide vanes assembly when it forms part of the compressor of the turbo machine and is known as a nozzle guide vane assembly when it forms part of the turbine of the turbo machine.

A stator guide vanes assembly or nozzle guide vane assembly is formed of angular sectors each comprising a plurality of blades held between two platforms. For example, for an axial-flow turbo machine, the blades are held between a radially outer platform known as the outer platform sector and a radially inner platform known as the inner platform sector.

In one method of manufacturing a blisk, a stator guide vanes assembly sector or nozzle guide vane assembly sector is formed using what is known as the "lost-wax" casting method in which:

first of all a wax (or some equivalent material) model of the stator guide vanes assembly sector is produced;
a mold is created around this model by dipping it into a slurry to form a layer of material in contact with its surface;
the surface of this layer is coated with sand and dried;
this operation of dipping into slurries possibly of different compositions is then repeated to form a shell made up of a plurality of layers;
the wax is then removed from the shell mold, this being an operation whereby the original model is eliminated;
molten metal is poured into the mold and solidifies;
the shell is broken off and manufacture of the stator guide vanes assembly sector is finished off.

During the manufacture of a stator guide vanes assembly sector using the lost-wax casting method, it is necessary for the platform sectors and the blades to be machined and then polished in order to correct manufacturing defects, and this adds to the cost. In general, it is necessary to use machining to correct the connection between the blades and the platform sectors and this is complicated because of the close proximity of the blades to one another, it being difficult to manipulate the machine tool appropriately.

Aside from the abovementioned disadvantages, a lost-wax casting method is costly to perform because of the numerous stages that the method comprises and because of the equipment needed to implement it.

According to another method of manufacture, the platform sectors and the blades are formed independently of one another and then brazed together. This method, known by those skilled in the art as "mechanically brazed" assembly is a process that is lengthy and complex to perform.

One possible solution might be to use a metal powder injection molding method of manufacture known by the abbreviation MIM, which offers numerous advantages in terms of having mechanical properties that are comparable with the advantages that can be had from forging methods. Furthermore, the cost of series-production of metal components using an MIM method are lower by comparison with a lost-wax casting method.

Remember that a method of manufacturing a metal component using MIM conventionally involves:

preparing a mixture of metal particles and thermoplastic binder;
molding the mixture in a mold to obtain a "green" blank of the component that is to be formed, the blank being of dimensions greater than the final dimensions of the metal component;
removal of the binder from the blank to form what is known as a "brown" blank which is therefore porous, and
sintering the "brown" blank to densify it, which causes shrinkage of the blank, the component thus formed being then at its final dimensions.

The MIM manufacturing technique is commonly used for the manufacture of relatively small-sized components. Proposals have also been made for this method to be used for the manufacture of the blades and of the platforms independently of one another, as described in published US Patent Application 2007/0102572 A1. The manufacturing method has to be supplemented by an assembly step, preferably using brazing, and this lengthens the manufacturing time.

One solution might be to use the MIM technique to manufacture the blisk sector in a single operation but the MIM method is not suited to the manufacture of large-sized metal components.

SUMMARY

In order to eliminate at least some of these disadvantages, the invention relates to a method of manufacturing an assembly comprising a plurality of blades mounted in a platform, in which method:

the blades are manufactured separately from the platform, the blades after manufacture being finished;
a platform blank formed at least of metal powder is prepared;
the finished blades are unified with the platform blank by sintering the metal powder.

The method of manufacture according to the invention benefits from the advantages of the MIM manufacturing technique while at the same time correcting the defects thereof. Specifically, during the method of manufacturing the platform by MIM, even while this platform is still a blank—it has not yet been densified by sintering—the finished blades are fitted into the platform, in the manner of inserts, which means that the blades can be positioned accurately with respect to the platform in this final service position. This positioning step is made all the more simple since the platform blank is not yet at its final dimensions and can be worked effortlessly.

According to a first embodiment of the invention, a mixture of metal powder and thermoplastic binder is prepared, a mold intended to receive the mixture of metal powder and thermoplastic binder is prepared and the finished blades are fitted into the mold, one end of the blades being positioned in the mold. The mixture is injected into the mold to obtain a platform blank, the mixture overmolding said ends of the finished blades in the mold in order to assemble the assembly. Following a binder-removal operation, the assembly comprising the platform blank and the finished blades is sintered to unify the assembly.

The sintering operation common to the platform and to the blades rigidifies the elements of the assembly in their final position, the shrinkage of the platform blank promoting connection to the blades.

In this embodiment, the finished blades are fitted prior to the injection of the mixture into the mold, and this guarantees that the blades can be positioned accurately with respect to the platform.

According to a second embodiment of the invention, a mixture of metal powder and thermoplastic binder is prepared, the mixture is injected into a mold to obtain a platform blank and one end of the finished blades is inserted into a housing formed in the platform blank in order to assemble the assembly. The assembly comprising the platform blank and the finished blades is sintered to unify the assembly.

According to a first alternative, an operation of removing the binder from the platform blank is performed prior to assembling the finished blades with said blank. That advantageously makes it possible to limit the risk of the blades becoming contaminated with the binder that comes out of the blank during the binder-removal operation.

Thus, the invention relates more particularly to a method of manufacturing an assembly comprising a plurality of blades mounted in a platform, in which method:
- the blades are manufactured separately from the platform, the blades after manufacture being finished;
- a mixture of metal powder and thermoplastic binder is prepared;
- the mixture is injected into a mold to obtain a platform blank;
- an operation of removing the binder from the platform blank is performed prior to assembling the finished blades with said blank;
- one end of the finished blades is inserted into a housing formed in the platform blank in order to assemble the assembly; and
- the assembly comprising the platform blank and the finished blades is sintered to unify the assembly.

According to a second alternative, the operation of removing the binder from the platform blank is performed after assembling the finished blades with said blank.

Advantageously, with the assembly comprising a plurality of finished blades the ends of which are mounted between an inner platform and an outer platform, the ends of the finished blades are unified with the platform blanks by sintering the metal powder.

Such a method advantageously makes it possible to form the sectors of a blisk the blades of which are positioned accurately and permanently between the platforms.

BRIEF DESCRIPTION OF THE DRAWINGS

The invention will be better understood with reference to the attached drawing in which.

DETAILED DESCRIPTION

A blisk, for example a stator guide vanes assembly of a turbojet engine compressor stage, is formed, in the conventional way, of a plurality of blades held between an annular outer platform and an annular inner platform. The stator guide vanes assembly disk is split into angular sectors that are manufactured independently and then joined together to form the stator guide vanes assembly disk after it has been mounted in the turbojet engine compressor stage.

Figure 1:
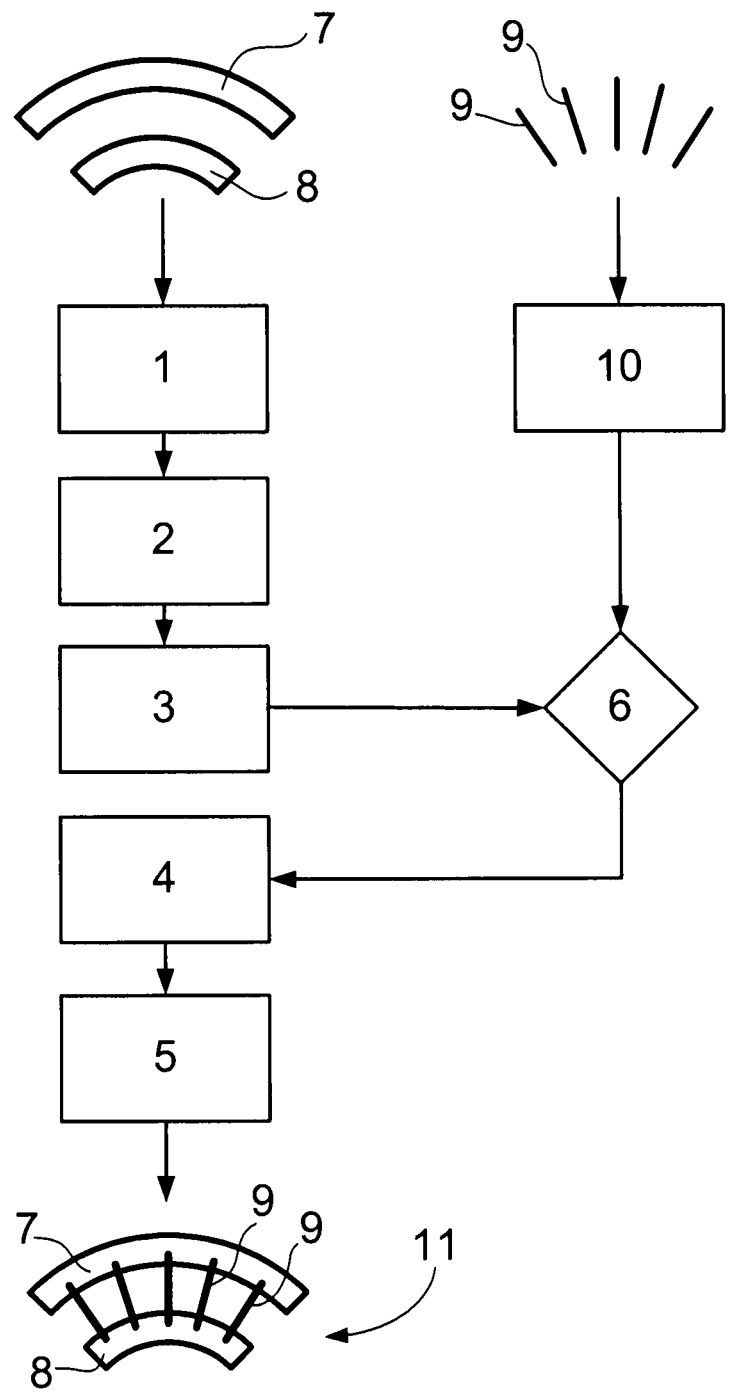
FIG. 1 is a diagram of the steps involved in a first embodiment of the method of manufacture according to the invention.

With reference to FIG. 1, each stator guide vanes assembly sector 11 comprises a plurality of blades 9 the radially inner end of which is fixed to an annular inner platform portion 8, known as the inner platform sector 8, and the radially outer end of which is fixed to an annular outer platform portion 7 known as an outer platform sector 7.

Still with reference to FIG. 1, according to a first embodiment of the method of manufacture according to the invention, the platform sectors 7, 8 are made by a metal injection molding (MIM) method in which a homogeneous mixture is prepared from fine powders of metal alloy (nickel, titanium alloy) and thermoplastic binder. The mixture is heated to a high enough temperature to melt the binder and allow the metal particles to become coated in binder (step 1 in FIG. 1). This binder may be made up of any polymer suitable for this use, such as polyethylene, polyethylene glycol, polymethylmethacrylate or propylene, for example.

Having been heated to a suitable temperature, the mixture is of a fluid-to-pasty consistency. It is kept at this temperature and introduced by injection at a set pressure into a mold the cavity of which corresponds to the shape of the component that is to be manufactured (step 2 in FIG. 1). In this example, each platform sector 7, 8 has its own mold with its own cavity. In particular, each cavity is in the form of a parallelepipedal cavity which is curved along its length, inserts being positioned inside the cavity to form housings in the platform which are intended to accept one end of the blades 9.

It goes without saying that the geometry of the platform—blade connection may adopt different forms (counterbore in the platforms, groove in the platforms, etc.).

It should be noted that the shape of the cavity takes account of the deformations that the platform sector undergoes during the next steps in the method, notably the sintering step. The rheological and injection pressure parameters are chosen so that the molding cavity is properly filled with the mixture. Each mold yields what is known as a "green" blank that is extracted from the mold once the thermoplastic binder has cooled and solidified (step 3 in FIG. 1).

The method of manufacturing the platform sectors by metal injection molding is interrupted so as to proceed with the step of assembling the stator guide vanes assembly sector 11.

The blades of the stator guide vanes assembly sector are, for their part, formed separately (step 10 in FIG. 1) using a conventional method (forging or lost-wax casting for example) or by a complete metal injection molding method in which the blades, having been removed from their injection mold, undergo a sintering operation to consolidate them and densify their structure. It goes without saying that the blades can be manufactured by a method involving the removal of material, rapid prototyping or drop forging.

The method of manufacture of blades is not part of the invention, the important thing being that the blades are prefabricated and finished. Finished blades are mainly as opposed to green blade blanks that have been removed from the MIM injection molds directly after the cooling and solidification of the thermoplastic binder without having undergone a sintering operation.

The blades thus formed may be solid or may contain air ventilation or instrumentation passages.

Still with reference to FIG. 1, in step 6, the finished blades 9, from the manufacturing step 10, are unified with the platform blanks 7, 8 from the manufacturing step 3. The blades 9 are positioned between the platforms 7, 8 accurately, the end of the blades 9 being introduced into the housings formed in said platforms 7, 8. Specifically, since the platform sectors 7, 8 are not yet at their final dimensions, unlike the blades 9, it is possible for the shape of the platforms 7, 8 to be adapted so that the blades 9 can be positioned accurately. The blades 9 also act as inserts in the platforms 7, 8, firstly allowing the platforms to be positioned accurately relative to one another and secondly allowing a fluidtight connection to be formed between the platforms 7, 8 and the blades 9 when the ends of the finished blades 9 are inserted into the green platforms 7, 8.

The assembly formed by the platform sectors 7, 8, connected by their blades 9, is then subjected to a binder-removal operation (step 4 in FIG. 1), the objective of which is, first of all, to extract at least some of the components of the binder of the platform blanks 7, 8 without deforming these blanks. The binder-removal operation advantageously has no effect on the finished blades 9, the blades 9 performing a function of holding the platforms 7, 8 in position during the binder-removal operation.

The elimination of some of the binder leads to a porous "brown" structure being obtained formed of metal particles bound by the residual binder. The porous structure both allows binder residue to be removed and allows internal pressures to be balanced, guaranteeing the dimensional stability of the platform sectors blank 7, 8. Depending on the materials used for the binder, the latter may be removed chemically, using appropriate solvents, or thermally. The remainder of the binder is removed in a second phase which is generally combined with the sintering operation that follows, in order to avoid any stresses likely to have an adverse effect on cohesion. For this reason, this second phase is generally performed thermally.

The assembly is then subjected to a sintering operation (step 5 in FIG. 1) in which the assembly is heated in a furnace up to a temperature close to, but lower than, the melting point of the metal material.

The temperature, the treatment time and the atmosphere in the furnace are controlled so that the metal particles bind together by diffusion. The pores of the structure are progressively reduced and the assembly becomes more dense during this step. Densification generally leads to a component shrinkage that may be of the order of 10 to 20%. The amount of shrinkage depends on the initial void volume before sintering and on the ratio between the volume of metal material and that of binder in the porous platform sectors 7, 8. It is also dependent on the level of densification performed.

Because the blades 9 have a dense structure prior to the sintering operation, a further sintering operation has no effect on the blades 9, the density of the blades 9 not increasing. The shrinkage of the platform sectors 7, 8 is guided by the blades 9 so that the latter are in their final service position at the end of the sintering operation. The shrinkage of the platform sectors 7, 8 around the ends of the finished blades 9 advantageously allows the blades 9 to be attached fixedly to the platform sectors 7, 8 in a manner that is also fluidtight. The ends of the blades 9 inserted into the body of the platforms 7, 8 join together structurally under the effect of the sintering.

In order to improve the connection between the blades and the platforms it is possible to create on the blades and/or the platforms a deposit that encourages the diffusion of the two parts that are to be assembled. In the case of blades made of nickel alloy, such as Inconel 718, this deposit may be a layer of nickel.

For preference, the conditions of the operation of sintering the platforms 7, 8 are set so that the platforms 7, 8 and the blades 9 have the same density at the end of the sintering operation. In this way a stator guide vanes assembly sector 11 is formed that has a uniform density and comprises radial blades 9 the ends of which are internally attached to the platform sectors 7, 8, the connection thus formed not requiring any additional rework operations.

The stator guide vanes assembly sector 11 from the sintering operation can be used as it is or alternatively can be subjected to other treatments depending on the intended end-use. The stator guide vanes assembly sector 11 may, for example, be subjected to a hot isostatic pressing operation known by the abbreviation HIP, which will generally lead to an increase in the density of the sector 11. The level reached may be 100%. During this treatment, the component is subjected to a temperature of between 800 and 1200° C., combined with a pressure of up to 150 atm.

The MIM technique offers numerous advantages in terms of mechanical properties which are comparable with those of cast products, the cost of implementing the MIM method being lower.

Figure 2:
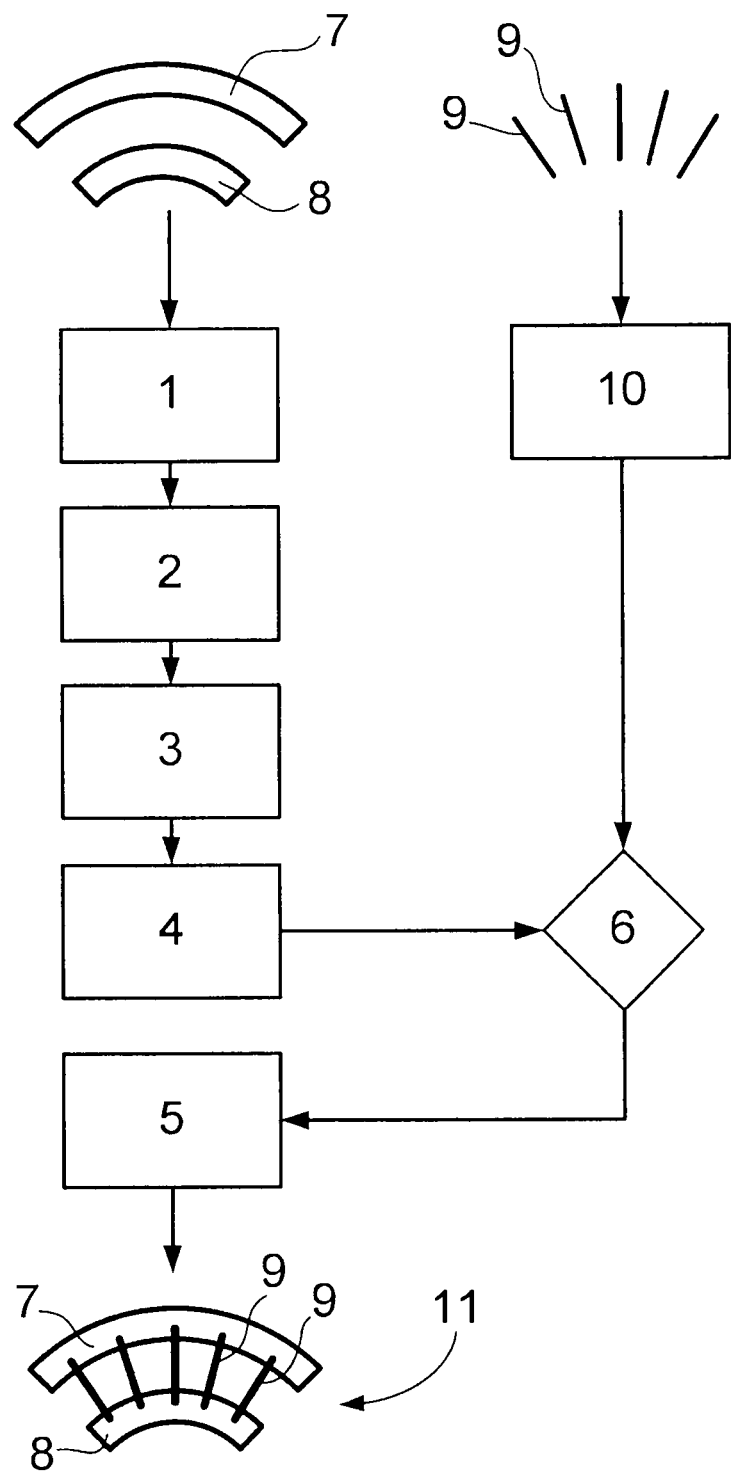
FIG. 2 is a diagram of the steps involved in a second embodiment of the method of manufacture according to the invention.

A second embodiment of the invention is described with reference to FIG. 2. The references used to describe the steps in FIG. 2 are the same as those already used to describe the steps in FIG. 1, to make the description simpler. Furthermore, the entire description of the embodiment of FIG. 1 is not repeated, this description applying to the elements of FIG. 2 where such description is not incompatible. Only notable structural and functional differences are described.

With reference to FIG. 2, in the second embodiment of the invention, the blades 9 from the manufacturing step 10 are unified with the platform sectors 7, 8 after an operation of removing binder from the green platforms 7, 8.

Specifically, after the binder-removal operation, the platform sectors 7, 8 are not yet at their final dimensions, unlike the blades 9, and it is still possible to adapt the shape of the platform sectors 7, 8 so that the blades 9 can be positioned accurately with respect to them.

Assembling finished blades 9 with the "brown" platform sectors 7, 8 advantageously makes it possible to limit the risk of the finished blades 9 becoming contaminated during the binder-removal operation during which binder residue is removed from the porous structure of the platform sectors 7, 8. Indeed, when the binder-removal operation is performed while the platforms 7, 8 are connected to the blades 9, there is a possibility that binder residue from the platforms 7, 8 could contaminate the blades 9, requiring the latter to be cleaned. Once the finished blades 9 have been assembled with the porous "brown" blanks 7, 8, the assembly is sintered to complete the unification of the blades 9 with the platform 7, 8.

The second embodiment of the invention advantageously makes it possible to get around the risk of contamination of the finished blades 9 while at the same time maintaining the advantages of the first embodiment.

Figure 3:
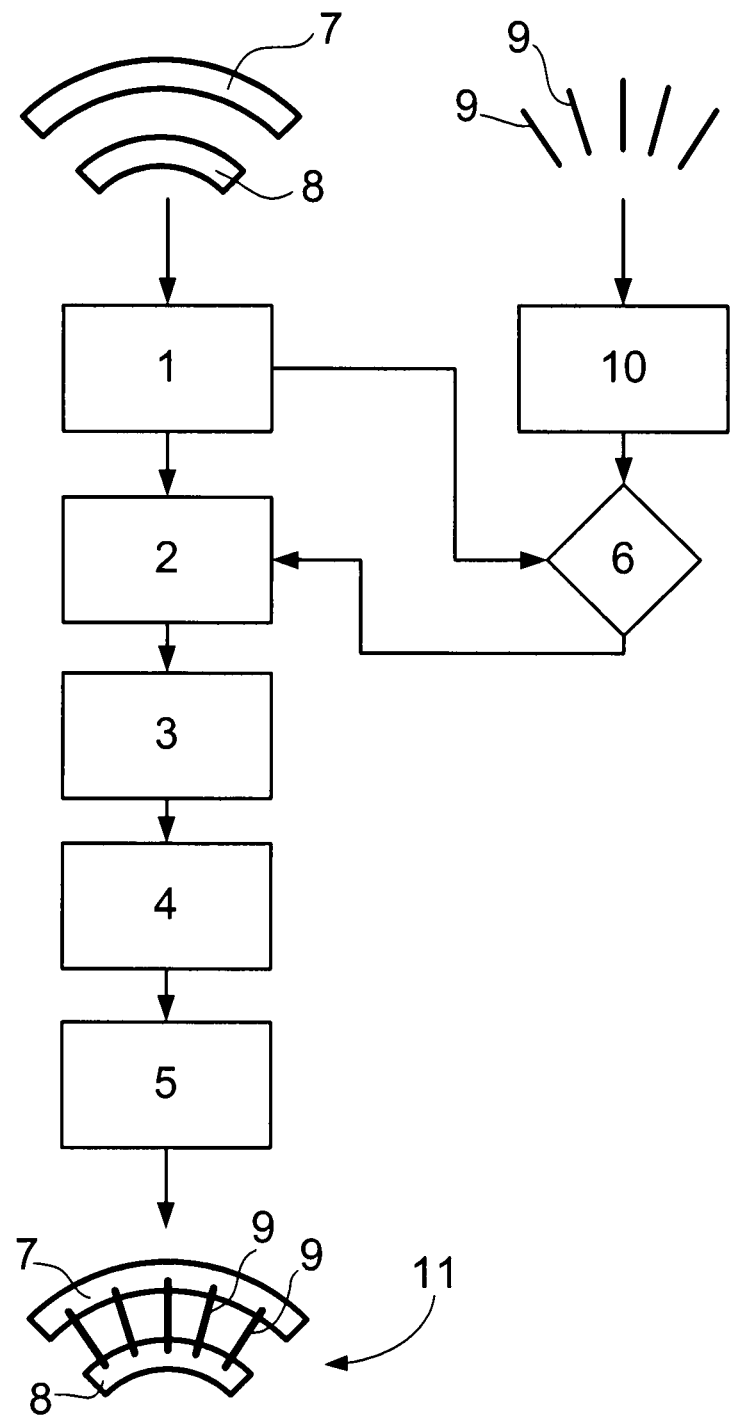
FIG. 3 is a diagram of the steps involved in a third embodiment of the method of manufacture according to the invention.

A third embodiment of the invention is described with reference to FIG. 3. The references used to describe the steps of FIG. 3 are the same as those already used to describe the steps of FIG. 1, to simplify the description. Moreover, the entirety of the description of the embodiment of FIG. 1 is not repeated, this description applying to the elements of FIG. 3 where it is not incompatible. Only notable structural and functional differences are described.

With reference to FIG. 3, in the third embodiment of the invention, the blades 9 from the manufacturing step 10 are fitted into the mold for the platform sectors 7, 8 prior to the injection of the mixture of metal powder and binder that has been prepared beforehand (step 1 of FIG. 3). During placement of the finished blades, one end of the blades is inserted into the mold of the outer platform and another end is inserted into the mold of the inner platform (step 6 in FIG. 3).

The pasty mixture of metal powder and binder is injected into the mold (step 2 of FIG. 3) and coats the ends of the blades 9 which protrude into the molds. Contact between the platforms 7, 8 and the blades 9 is therefore ensured, the platforms 7, 8 in pasty form tightly hugging the ends of the blades 9. The blades 9 and the platforms 7, 8 are then assembled in their definitive position.

In this embodiment, each mold comprises a cavity that has no inserts because, given that the connection between the blades 9 and the platforms 7, 8 is made directly, there is no need to form housings in the platforms 7, 8 for assembling the blades 9.

Each mold yields what is known as a "green" blank which is extracted from the mold once the thermoplastic binder has cooled and solidified (step 3 of FIG. 1), the "green" blanks 7, 8 being mechanically joined together by the finished blades 9. The blades 9 and the platform sectors 7, 8 then have their binder removed (step 4 in FIG. 3) and are then sintered (step 5 in FIG. 3).

Thanks to this third embodiment, the blades 9 are closely and internally connected to the platforms 7, 8, thus guaranteeing a high-quality connection.

The invention claimed is:

1. A method of manufacturing an assembly comprising a plurality of blades mounted in a platform, comprising:
   manufacturing the blades separately from the platform, and finishing the blades after the manufacturing;
   preparing a mixture of metal powder and thermoplastic binder;
   injecting the mixture into a mold to obtain a platform blank;
   removing the binder from the platform blank prior to assembling the finished blades with said blank;
   inserting one end of the finished blades into a housing formed in the platform blank in order to assemble the assembly, the finished blades being fitted into the platform blank when the platform blank has not yet been densified by sintering; and
   sintering the assembly comprising the platform blank and the finished blades to unify the assembly.

2. The method as claimed in claim 1, in which the assembly comprises a plurality of finished blades the ends of which are mounted between an inner platform and an outer platform, and the ends of the finished blades are unified with the platform blanks by sintering the metal powder.

3. The method as claimed in claim 1, further comprising creating a deposit on at least one of the finished blades and the platform blank, the deposit encouraging diffusion of the finished blades and the platform blank.

* * * * *